April 24, 1951 T. J. CARMICHAEL 2,550,403
TRANSMISSION CONTROLLED BRAKE RELEASE
Filed May 1, 1946
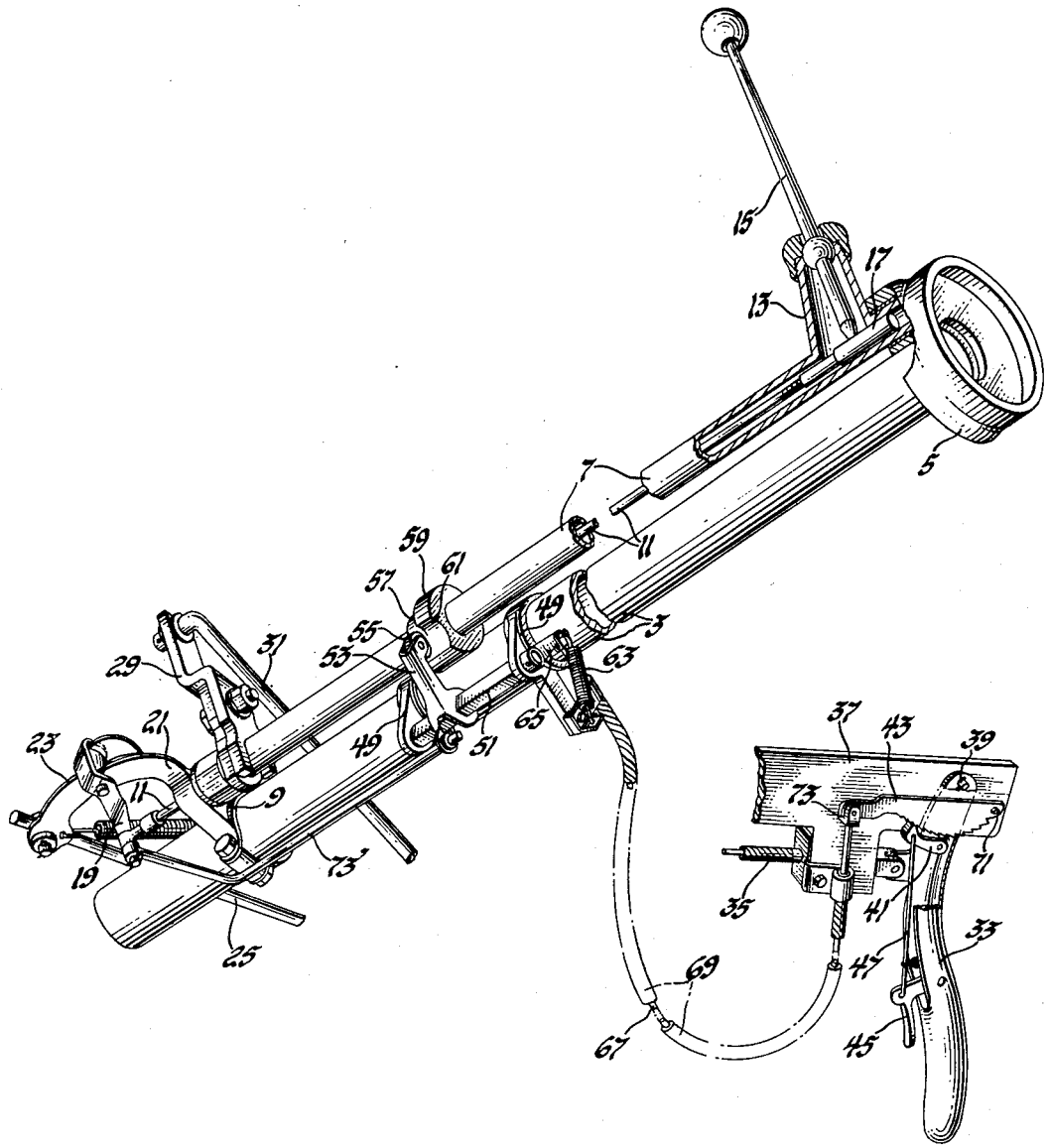
Inventor
Thomas J. Carmichael
By Blackmore, Sweer & Flint
Attorneys Patented Apr. 24, 1951

2,550,403

UNITED STATES PATENT OFFICE 2,550,403

TRANSMISSION CONTROLLED BRAKE RELEASE

Thomas J. Carmichael, Walled Lake, Mich., assignor to General Motors Corporation, Detroit, Mich., a corporation of Delaware Application May 1, 1946, Serial No. 666,335

9 Claims. (Cl. 192—4)

The parking brake on motor vehicles is sometimes inadvertently not released before the operator starts to drive the car. In accordance with this invention a simple device is made available, the object of which is to automatically release the parking brake simultaneously with the shifting of the gears into driving positions.

The invention is illustrated on the accompanying drawing showing in a single figure a perspective of one embodiment of the inventive idea.

Referring to the drawing, a steering post is shown at 3. The steering shaft which is within the post and the steering wheel at its upper end are not shown. Adjacent the upper end of the post is a bracket 5 rotatably supporting a tubular shaft 7 extending along the post and journalled in a bracket 9 at its lower end. Reciprocable within shaft 7 is a rod 11. Adjacent bracket 5 the shaft 7 has an arm 13 at the outer end of which is seen the ball joint of a lever 15, the inner end of which is supported by a block 17 carried by rod 11. At its lower end the rod 11 is connected to a lever 19 which is pivoted to an arm 21 of bracket 9. Lever 19 has an arm 23 connected to a rod 25. Rocking of handle or lever 15 is operable to reciprocate rod 11 and such reciprocation acts, by means of lever arm 23 and rod 25, to select between pairs of gear trains, one of which is to be subsequently rendered active. The tubular shaft is provided with an arm 29 from which a rod 31 extends to the gear box to render active the selected gear train. This is a well-known arrangement and needs no further explanation.

Also commonly found on motor vehicles and usually mounted adjacent the instrument panel is a lever operable to apply the emergency or parking brake. The drawing shows, in conventional fashion, such a parking brake lever at 33 with a cable 35 attached thereto and operable to apply brakes at the wheels. As usual the lever 33 is pivoted to a convenient support 37 at 39 and is provided with a pawl 41 adapted to engage the teeth of a ratchet plate 43. The pawl may be released from the ratchet by any sort of manual lever 45 and link 47.

The invented structure is intended for use with the parts above described. Attached to the steering post is seen a pair of spaced end supports 49 for rotatably mounting a rockshaft 51. Mounted to rotate with but to slide on shaft 51 is a cam follower arm 53 having at its end a roller 55 to engage a double cam 57—59 mounted on the tubular shaft 7. The cam structure includes a groove 61 extending along the surface of both parts 57 and 59 of the cam and the roller is biased to enter the groove by a spring 63 anchored to one support 49 and attached to a rockshaft arm 65. From arm 65 a cable 67 in a housing 69 extends to and is attached to the end of the ratchet plate 43. In the present arrangement the ratchet plate is held in position by support 71 at one end and by the cable attachment at 73 at the other end.

It is intended that, when lever 15 is in its neutral position, the roller 55 shall be in the groove 61. The walls of the cam on either side of the groove may be shaped to rock the cam follower 53 and this pushes the cable 67 and lifts the ratchet plate from the pawl so that the parking brake is released by its usual releasing spring.

It may be desirable to thus release the brake when shifts are made to each of the forward speeds but to leave it engaged when the gear train for reverse is engaged. For parking on hills it is often convenient to leave a gear train active and the parking brake engaged. It is for that reason that the special double cam is used. The part 59 is shaped so that the lever 53 is rocked for each direction of rotation of shaft 7, which rotation is for engaging gearing for high speed and second speed. For low speed the lever is to be moved along the supporting shaft until its roller lies opposite cam 57. To effect such sliding of the cam follower or arm 53 it is connected by a rod 73' to the lever 19 adjacent the connection of rod 11 with said lever 19. When lever 15 is lifted and rod 11 moves downwardly to select the low and reverse gear mechanism rod 73' moves the cam follower to a position opposite cam 57. This cam 57 will preferably have a raised portion only that side of the groove 61 which corresponds with low speed.

By the above arrangement whenever a shift is made for any forward speed the emergency brake, if inadvertently left applied, will be released. If it be desired to leave the car in gear with the emergency brake applied it may be done since there is no cam to release the parking brake when the reverse gear train is engaged.

I claim:

1. For use on a vehicle having a parking brake with holding means and having vehicle drive ratio changing means, a rotary shaft and connections therefrom to change the vehicle driving ratio in response to shaft rotation, cam means on said rotary shaft, a cam follower rocked thereby and connecting means between said cam follower and said holding means to release the latter.

2. The invention defined by claim 1, the cam and cam follower constructed to release the holding means for all forward driving positions of said parts.

3. The invention defined by claim 1, together with gear ratio selecting means, and a connection therefrom to said cam follower whereby the latter is moved to predetermined positions adjacent said cam means.

4. The invention defined by claim 1, together with a gear ratio selecting means reciprocable through said rotary shaft, a connection therefrom to said cam follower whereby the latter is moved to predetermined positions adjacent said cam means, said cam means being contoured to release the brake for all forward driving ratios only.

5. For use on a vehicle having a parking brake with holding means mounted adjacent the steering column, a control shaft rotatably mounted on said steering column and a connection from the control shaft to control the transmission in response to shaft movement, cam means on said shaft, connecting means operative on movement of said control shaft to release the brake holding means.

6. For use on a vehicle having a parking brake with holding means and a transmission, a rotatable control shaft and connections therefrom to control the transmission in response to shaft movement, actuating means responsive to rotation of said shaft, connecting means operative between said actuating means and said brake holding means to release the latter on rotation of the control shaft, said actuating means include a cam fixed to said control shaft and said connecting means including a cam follower.

7. For use on a vehicle having a parking brake with holding means and a transmission, a rotatable control shaft and connections therefrom to control the transmission in response to shaft movement, actuating means responsive to rotation of said shaft, connecting means operative between said actuating means and said brake holding means to release the latter on rotation of the control shaft, said parking brake including a brake lever and said holding means including a pawl and ratchet to hold the brake applied, and said connecting means being connected to the ratchet of said brake holding means.

8. For use on a vehicle having a parking brake with holding means and a transmission, a rotatable control shaft and connections therefrom to control the transmission in response to shaft movement, independent actuating means directly attached to said shaft and responsive to rotation of said shaft, connecting means operative between said actuating means and said brake holding means to release the latter on rotation of the control shaft.

9. For use on a vehicle having a parking brake with holding means and a transmission, a steering column, a control shaft movably mounted on said steering column and having a portion closely adjacent said steering column, a connection from the control shaft to control the transmission in response to shaft movement, actuating means on said shaft portion, connecting means supported on said steering column and operative between said actuating means and said brake holding means to release the latter on movement of the control shaft.

THOMAS J. CARMICHAEL.

REFERENCES CITED

The following references are of record in the file of this patent:

UNITED STATES PATENTS

| Number | Name | Date |
|---|---|---|
| 1,614,367 | Jackson | Jan. 11, 1927 |
| 1,831,301 | Griffin | Nov. 10, 1931 |
| 2,018,469 | Roehrl | Oct. 22, 1935 |
| 2,154,513 | Kuntz | Apr. 18, 1939 |
| 2,202,949 | Girardi | June 4, 1940 |
| 2,220,620 | Capen | Nov. 5, 1940 |
| 2,278,351 | Havens | Mar. 31, 1942 |
| 2,298,509 | Phipps | Oct. 13, 1942 |
| 2,312,975 | Peterson | Mar. 2, 1943 |
| 2,340,339 | Nicol | Feb. 1, 1944 |
| 2,490,704 | Rogers | Dec. 6, 1949 |